Jan. 31, 1956 W. VAUGHAN 2,732,623
GLASS CUTTING MACHINE
Filed June 21, 1951 4 Sheets-Sheet 1

INVENTOR
WILLIAM VAUGHAN
BY
Louis L. Gagnon
ATTORNEY

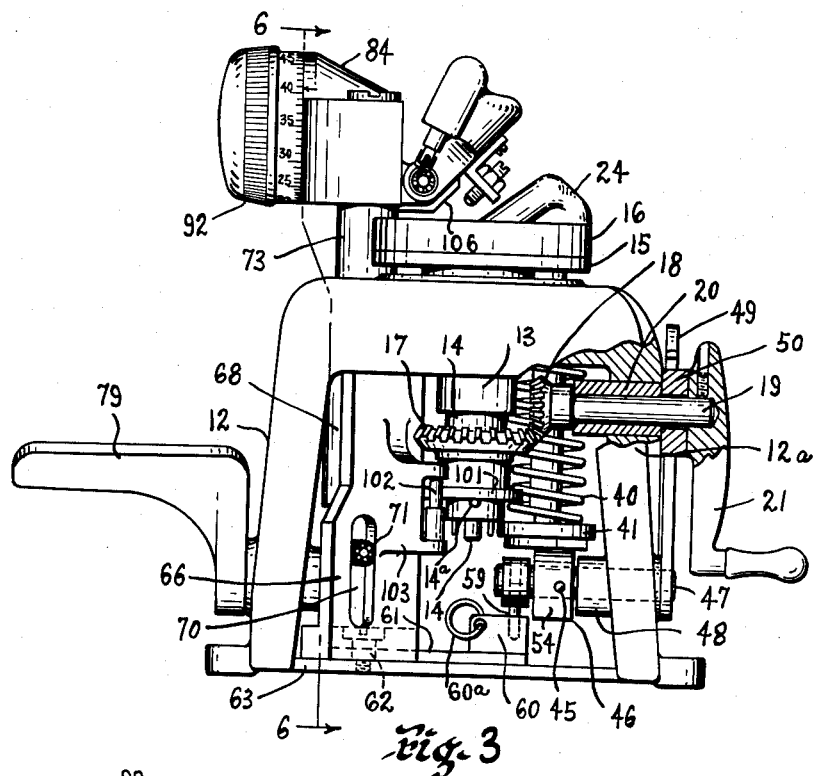
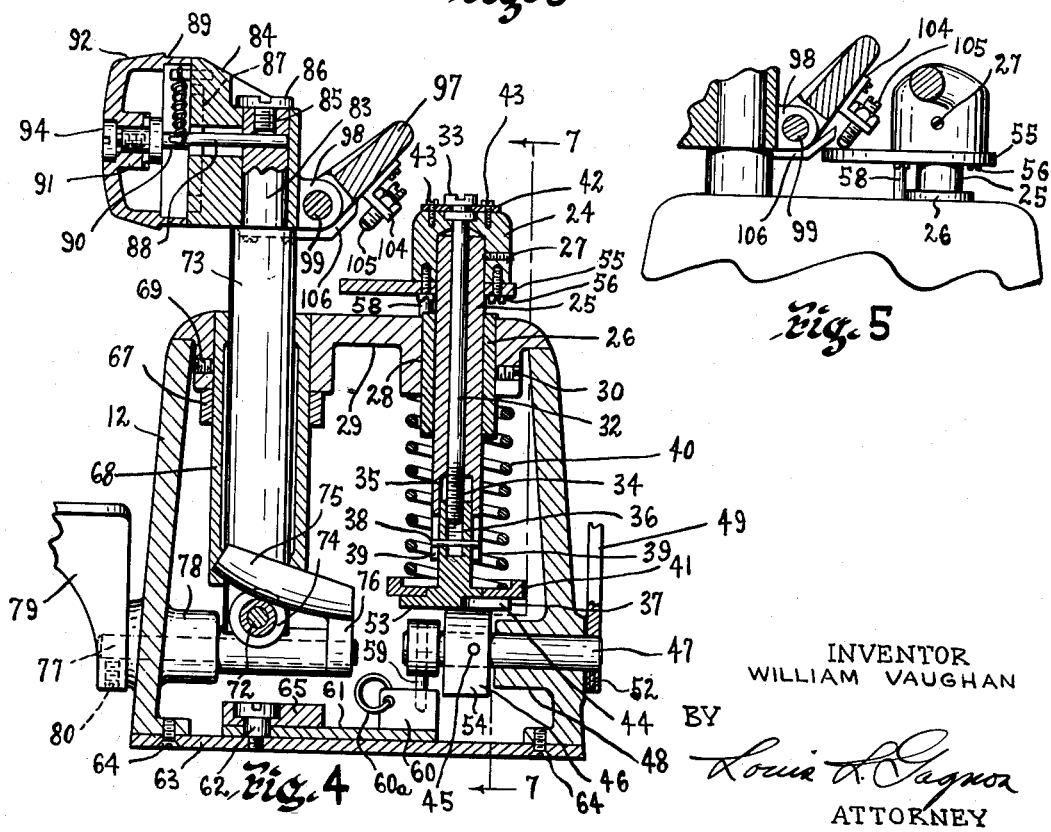

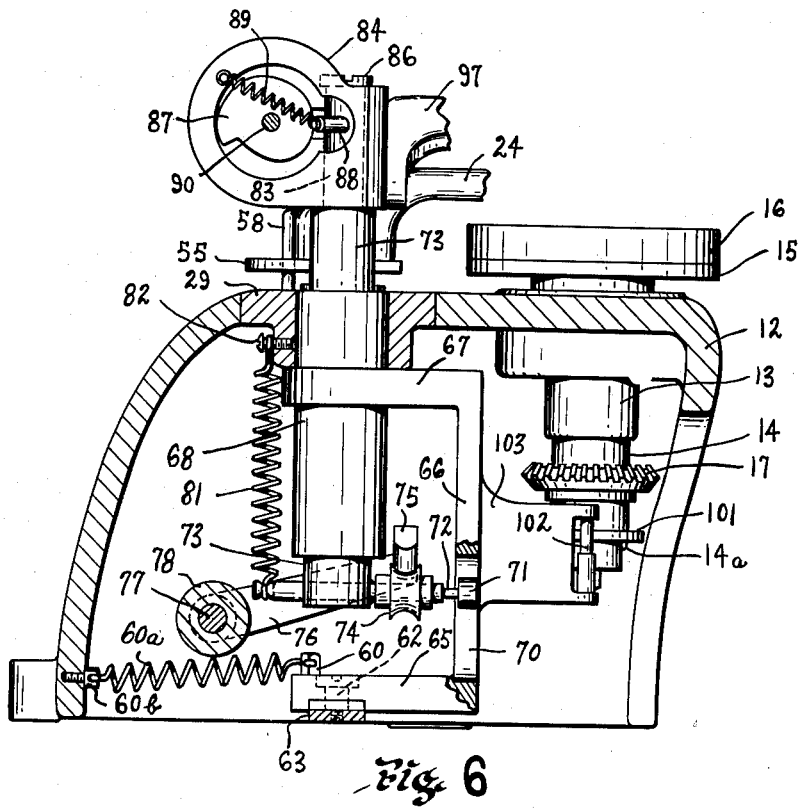

Jan. 31, 1956
W. VAUGHAN
2,732,623
GLASS CUTTING MACHINE
Filed June 21, 1951
4 Sheets-Sheet 4
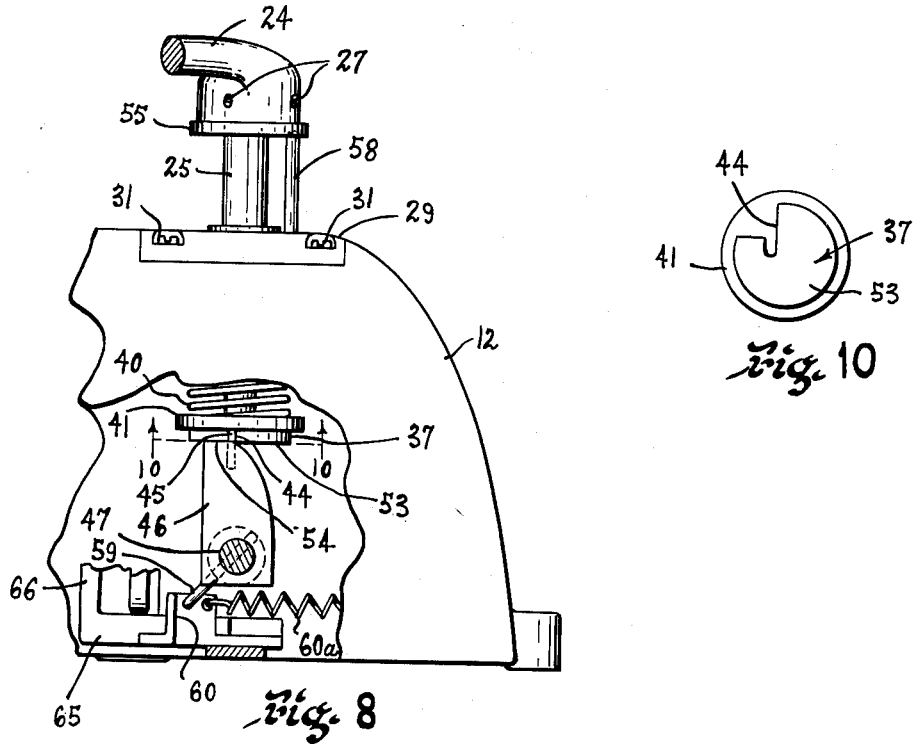
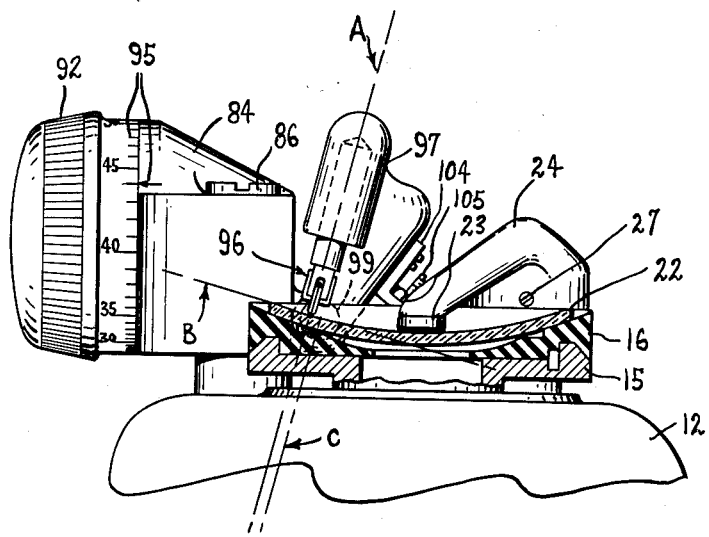
INVENTOR
WILLIAM VAUGHAN
BY
Louis L. Gagnon
ATTORNEY

United States Patent Office 2,732,623
Patented Jan. 31, 1956

2,732,623

GLASS CUTTING MACHINE

William Vaughan, Woodstock, Conn., assignor to American Optical Company, Southbridge, Mass., a voluntary association of Massachusetts Application June 21, 1951, Serial No. 232,819

16 Claims. (Cl. 33—28)

This invention relates to improvements in optical machinery and has particular reference to a novel machine for cutting glass articles such as lenses to different desired contour shapes and sizes.

One of the principal objects of the invention is to provide a machine of the above character which will enable accurate location of the work or lens on the work supporting table of the machine and in more accurate relation with the cutting tool whereby the path of the cut and the pressure of the cutting tool on the work or lens being cut may be more positively controlled.

Another object is to provide a simple and novel arrangement whereby the cutting tool, when pressed against the surface of the work or lens to be cut, will automatically tilt and assume a position substantailly normal to the tangent at the point of contact with the surface engaged thereby throughout the path of the cut regardless of the curvature of the engaged surface.

Another object is to provide an arrangement in a machine of the above character whereby the pressure on the lever for controlling the cut by the cutting tool may be more accurately controlled throughout the cycle of movement of the work or lens relative to said tool.

Another object is to provide an arrangement in a machine of the above character whereby the operator may readily gain access to the pattern to afford ease of interchangement thereof.

Another object is to provide an arrangement in a machine of the above character whereby the head carrying the cutting tool and the work or lens clamping arm may be simultaneously and respectively moved outwardly in a sidewise direction with respect to the work or lens supporting table whereby the view of the operator, when centering the work or lens on the supporting table, will be unobstructed and the said work or lens may be more accurately centered and positioned on said table.

Another object is to provide means associated with the work or lens clamping arm and separate of the cutter supporting arm for automatically controlling the angle of tilt of the cutter with respect to the engaged surface of the work or lens throughout the cycle of the cut.

Another object is to provide adjustable means for varying and controlling the initial angle of tilt of the cutting tool relative to the surface of the work or lens engaged thereby.

Another object is to provide means for automatically and positively centering the pad with respect to the table as the pad is moved downwardly into clamping position.

A further object is to control the direction of cut whereby the completion of the cutting cycle is clearly visible and overlapping cuts may be avoided.

Another object is to provide, in a machine of the above character, an arrangement whereby different standard lens shape-controlling formers or commercially available patterns may be used.

Other objects and advantages of the invention will become apparent from the following description taken in connection with the accompanying drawings and it will be apparent that many changes in the details of construction and arrangements of parts may be made without departing from the spirit of the invention as expressed in the accompanying claims. It is, therefore, not desired that the invention be limited to the specific details of construction and arrangement of parts as set forth herein as the preferred form only has been given by way of illustration.

Referring to the drawings:

Fig. 3 is a front elevational view of said device shown partially in section;

Fig. 4 is a sectional view taken as on line 4—4 of Fig. 2 and looking in the direction indicated by the arrows;

Fig. 5 is a fragmentary view shown partially in section illustrating particularly the mechanism for controlling the angle of tilt of the cutter supporting arm;

Fig. 6 is a sectional view taken approximately along line 6—6 of Fig. 3 and illustrating additional more inwardly disposed portions as being cut away to more clearly illustrate the related mechanisms;

Fig. 7 is a fragmentary sectional view taken approximately along line 7—7 of Fig. 4 looking in the direction indicated by the arrows and illustrating a portion of the related mechanism in one position of adjustment;

Fig. 8 is a view generally similar to Fig. 7 illustrating another position of adjustment of the related mechanism;

Fig. 9 is a fragmentary front elevational view of the upper portion of the device showing the lens supporting table as being sectioned along 9—9 of Fig. 2 and looking in the direction indicated by the arrows; and Fig. 10 is a view looking in the direction indicated by arrows 10—10 of Fig. 8 of a portion of the mechanism for controlling the movement of the lens clamping device.

Figure 1:
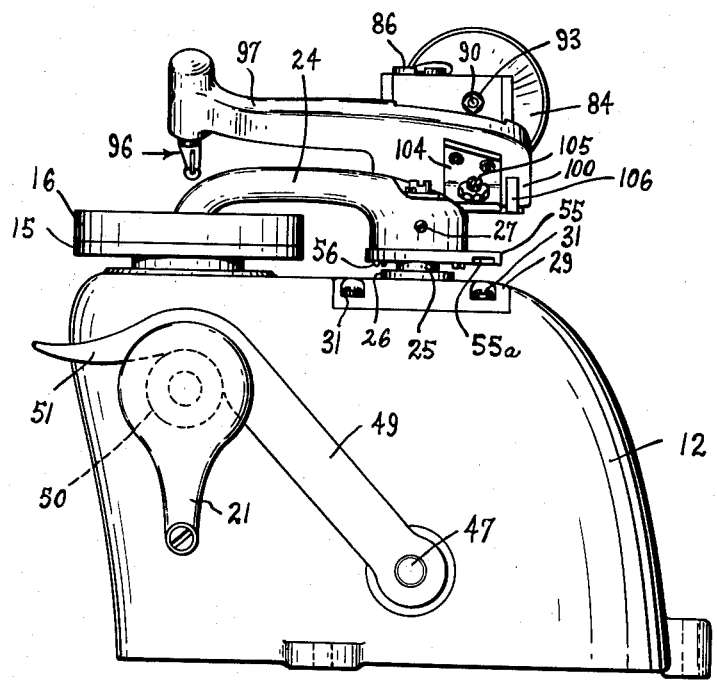
Fig. 1 is a side elevational view of the device embodying the invention.

Referring to the drawings wherein like characters of reference designate like parts throughout the several views, the device embodying the invention comprises a base 12 having a vertical bearing 13 in the upper front portion thereof in which a shaft 14 carrying the table 15 is rotatably supported. Mounted on the shaft 14 is a bevelled gear 17 which meshes with a gear 18 carried by a shaft 19 which is mounted in a bearing 20 in the side wall 12a of the base 12 and is provided on the outer end thereof with a crank 21 whereby the lens supporting table 15 may be rotated.

Figure 2:
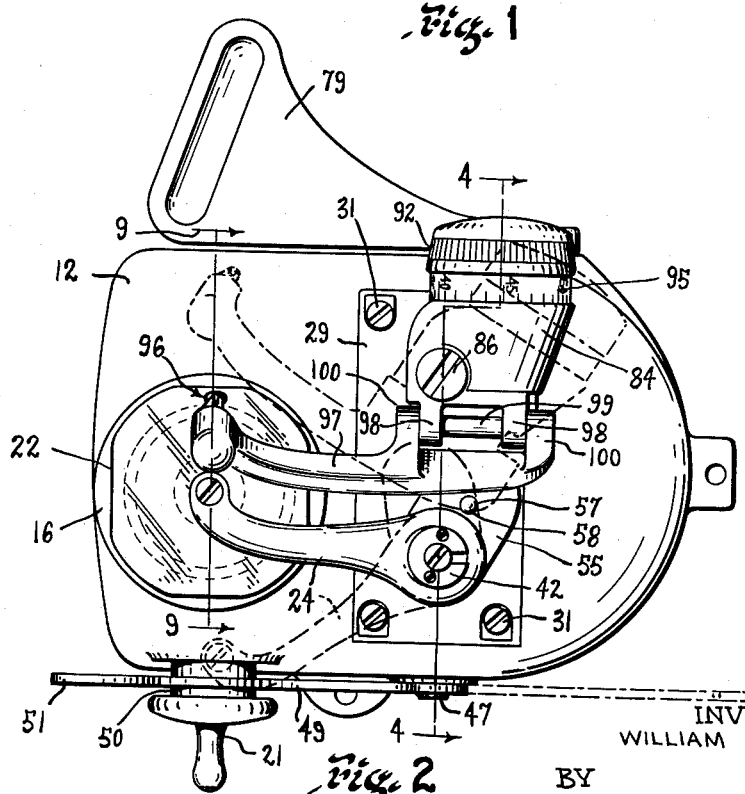
Fig. 2 is a top plan view of said device.

The article or lens 22 to be cut, as shown in Figs. 2 and 9, is firmly held on a pad 16 carried by the table 15, by means of a bearing member 23 rotatably supported in the end of a clamp arm 24. The clamp arm 24 is mounted on the end of a shaft 25 (Figs. 4, 7 and 8) rotatably supported within a bearing 26. The arm 24 is secured to the shaft 25 by means of radially disposed set screws 27. The bearing 26 is mounted within an opening 28 formed in a removable plate member 29 an is secured therein by a set screw or the like 30. The plate 29 is secured to the base by suitable screws or the like 31. The shaft 25 is provided with a hollow bore in which is extended a screw-like member 32 having a slotted head portion 33 and a threaded end portion 34. The bore of the shaft 25, adjacent the lower end thereof, is of increased diameter as illustrated at 35 and has the stem 36 of a cam member 37 extended therein, said stem 36 having a threaded bore connected with the threaded end 34 of the screw 32. The stem 36 is provided with a pin 38 which is slidably received within opposed slots 39 formed in the lower end of the shaft 25 and communicates with the enlarged end 35 of the bore. The pin 38 is adapted to lock the stem 36 against rotation wih respect to the shaft 25.

Encircling he shaft 25, there is a coil spring 40 which adjacent its upper end fits over the lower end of the bearing 26 and which, at its lower end, fits within a countersunk washer 41 positioned on the stem 36 directly above the cam member 37. The head 33 of the screw 32 is provided with a circumferential groove in which is fitted a spanner member 42. The spanner member 42 is secured to the upper end of the clamp arm 24 by suitable screws 43 and functions to retain the screw 32 against longitudinal movement relative to the shaft 25 while permitting rotation of said screw.

The shaft 25 carrying the clamp arm 24 can be moved longitudinally of the bearing 26 in an upward or downward direction while permitted to rotate in said bearing. The spring 40, whose tension may be varied by tightening or loosening the screw 32, is adapted to constantly urge the clamp arm 24 in a downward direction and controls the pressure of the bearing means 23 on the article or lens 22 to be cut. The cam 37, as shown in Fig. 10, is provided with a side bearing surface 44 adapted to be engaged by a pin 45 carried by a cam block 46 mounted on a shaft 47 which is rotatably mounted in a bearing 48 formed in the lower side wall of the base 12. Mounted on the outer end of the shaft 47 is a lever 49 having a portion shaped to extend about a sleeve 50 mounted on the shaft 19 and terminating in a hand-grip end portion 51, see Figs. 1, 2, 3 and 4. The said lever 49 is secured to the shaft 47 by a set screw or the like 52. When the lever 49 is moved rearwardly, the cam block 46, rotating with the shaft 47 and bearing against the lower surface 53 of the cam member 37, will cause the shaft 25 to move upwardly in the bearing 26 against the tension exerted by spring 40 whereupon the pin 45 will engage the side surface 44 of the cam 37 and cause the said shaft 25 to rotate in the bearing, thereby causing the arm 24 to swing in an outward direction relative to the longitudinal axis of the table 15. This function, therefore, raises the bearing pad 23 upwardly clear of the article or lens 22 and thence moves the arm 24 outwardly to a position to one side of the table 15, as indicated by the dot-dash lines in Fig. 2. The extent of movement of the lever 49, in moving the clamp arm 24 outwardly and in a sidewise direction, is of an amount sufficient to cause the flat end 54 of the cam block 46 to be moved into engagement with the flat undersurface 53 of the cam member 37, see Fig. 8. This holds the lever arm 24 in said upward and outward position.

It is particularly pointed out that the arm 24 moves outwardly in a sidewise direction an amount sufficient to enable the operator to have a clear and unobstructed view of the top of the table 15.

To insure the proper centering of the pad 23 with the axis of the table 15, when the clamp arm is swung inwardly and allowed to be forced downwardly by the coil spring 40, the arm 24 is provided with a plate 55 secured thereto by suitable screws 56 and having an opening 57 therein adapted to receive an upwardly extending pin in member 58, see Figs. 1, 2, 6, 7 and 8. The plate 55, in the undersurface thereof, is provided with a curved groove 55a, Fig. 1, communicating with the opening 57 and in which the end of the pin 58 is adapted to be seated and guided into alignment with the opening 57 whereupon the pin, when aligned with the opening 57, will permit the arm 24 and shaft 25 to be drawn downwardly by the spring 40. The pin 58, when aligned with the opening 57, automatically centers the bearing means 23 with the axis of the table 15.

Mounted on the shaft 47 is a sleeve carrying a pin 59 (Figs. 4 and 8) which, simultaneous to the rotation of the cam block 46 through the rearward movement of the lever 49, is adapted to engage and move an upright 60 carried by an arm 61 pivotally attached at 62 to a tie member 63 attached to the base by screws or the like 64. The arm 61 is attached to the bottom of a yoke 65 having an upright portion 66 (Fig. 6) and an upper portion 67 which is rotatably mounted on a vertical bearing member 68. The bearing member 68 is secured within an opening in the detachable plate 29 by means of a set screw 69, see Fig. 4. The axis of the bearing 68 is coaxial with the axis of the pivot 62 so that when the lever 61 is rocked on the pivot 62, the upper portion 67 of the yoke will simultaneously rotate on the bearing 68. A coil spring 60a has one end connected to the upright 60 and its other end connected to the rear wall of the housing by a lug 60b and serves to continually urge the upright 60 rearwardly. The upright 66, as shown in Figs. 3, 6 and 7, is provided with a vertically disposed slot 70 in which is positioned a roller 71 carried by the forward end of a pin 72 which extends through the lower end of a shaft 73 slidably and rotatably mounted within the bearing 68. A grooved roller 74 is slidably and rotatably mounted on the pin 72 rearwardly of the roller 71 and is adapted to be engaged by a curved foot 75 mounted on the forward end of a lever 76. The lever 76 is attached to a shaft 77 rotatably supported in a bearing 78 formed in the side wall of the base opposed to the wall having the bearing 48 therein for the lever 49. A lever 79 is attached to the outer end of the shaft 77 by means of a set screw or the like 80 whereby the foot 75 may be forced downwardly against the grooved roller 74 which will, in turn, cause the shaft 73 to move downwardly of the bearing 68. A coil spring 81 (Fig. 6) has one end attached adjacent the free end of the pin 72 and has its other end connected as by screw 82 to the detachable plate 29 and normally retains the shaft 73 in a raised position. The foot 75, as it moves up and down about the axis of the shaft 77, describes an arc and, therefore, proper engagement thereof with the grooved roller 74 is afforded by slidably mounting the roller 74 for longitudinal movement on the pin 72 so that it will automatically adjust itself for proper seating of the foot 75 within the groove formed therein.

Due to the fact that the roller 71 rides within the vertical slot 70 of the upright portion 66 of the yoke, movement of said yoke about the pivot pin 62 and its pivotal connection 67 with the bearing 68 will simultaneously cause the shaft 73 to rotate in said bearing 68.

The vertical shaft 73 has a reduced upper end portion 83 (Figs. 4 and 6) upon which is rotatably mounted a head 84. A screw 85 having a head portion 86 of larger diameter than the reduced portion 83 is threaded into the reduced portion 83 and surface to retain the head 84 thereon.

The head 84 is provided with a pair of spaced ears 98 (Figs. 2 and 4) extending in a direction toward the clamp arm 24, the ears 98 having co-axial bores provided therein for reception of a transverse shaft 99. The ends of the shaft 99 are disposed within suitable bearings (not shown) carried by spaced bearing portions 100 of a cutter supporting arm 97 whereby the arm 97 is rotatable about the shaft 99.

The cutter supporting arm 97 is adapted to extend forwardly into overlying relation with the lens 22 and is provided with a suitable cutter 96 such as a metal disc, diamond or the like, which, upon downward movement of the lever 79 and consequent downward movement of the shaft 73, is adapted to engage the lens 22. As the handle 21 is manually rotated, as described above to rotate the lens 22, the cutter 96 will cut the lens 22 to a controlled contour shape similar to the contour shape of the pattern 101 which is removably carried by suitable means such as spring grip members 14a on the shaft 14 below the bevelled gear 17 (Fig. 6) the edge of the pattern 101 is adapted to be engaged by a follower 102 carried by a bracket 103 attached to the upright portion 66 of the yoke 65. Thus, as the pattern 101 is rotated, the follower 102, which is maintained in engagement therewith through the action of the spring 60a, will cause the shaft 73 to rotate slightly as it follows the contour edge of the pattern 101, whereby the cutter supporting arm 97 and consequently the cutter 96 will be moved accordingly. The lens 22 will thus be provided with a contour shape similar to the shape of the pattern 101.

Means is provided for rotating the cutter supporting arm 97 to swing it in an outward direction relative to the longitudinal axis of the table 15 simultaneously with the outward swinging movement of the pressure arm 24, since the pin 59 is so located in the sleeve carried by shaft 47 that after the cam 46 has lifted the pressure arm 24 off the lens 22, upon manual operation of the lever 49, the pin will engage the upright 60 simultaneously with the engagement of the pin 45 with cam member 37. Thus the arms 24 and 97 are swung apart simultaneously to permit ready access to the table 15 for interchanging lens blanks. It will be noted that the follower 102 is preferably formed as a roller having portions of different diameters whereby different standard commercially available patterns may be used, which patterns differ slightly in overall size. With the present construction, proper size control of the resulting lens can be accomplished by mounting the selected pattern 101 so as to engage the desired portion of the follower 102.

The foot 75 is provided with an outward and upward curvature of its surface engaging the roller 74. Thus, as variously curved portions of the lens 22 are engaged by the cutter 96, the cutter will be caused to move in a sidewise direction by the pattern 101 and will also simultaneously move up and down. However, the curvature of the foot 75 is so controlled that little, if any, motion will be transmitted to the lever 79 and thus the operator can maintain a more constant pressure thereon throughout a cutting cycle.

The cutter supporting arm 97 is mounted to rotate about the axis of the shaft 99 as described to properly angle the cutter 96 with respect to the engaged portion of the lens blank 22. When the lens blank 22 is positioned upon the pad 16 and the clamp arm 24 positioned so that the bearing member 23 engages the concave surface of the lens blank 22 and forcibly urges the lens blank 22 toward the pad 16, the plate 55 on arm 24 will automatically move to a controlled position above the upper surface of the base 12 in accordance with the thickness of the lens blank 22, surface curvature, and its position upon the pad 16. An angled bracket 104 (Fig. 5) is secured to the cutter supporting arm 97 and carries an adjusting screw 105 which is adapted to engage the upper surface of the plate 55 as the cutter 96 is moved toward the lens blank 22 by depression of lever 79.

An angled stop member 106 is attached at one end to the head 84 and is adapted to be engaged by the side of the cutter supporting arm 97 when the device is in inoperative position which prevents the arm 97 from hitting against the clamping arm 24 and also causes the arm 97, due to gravity, to rotate a limited amount about the axis of the shaft 99 which will normally position the adjusting screw 105 in a plane lower than the plane of the cutting edge of the cutter 96. Upon continued downward movement of the lever 79, the engagement of the adjusting screw 105 with the plate 55 will cause the arm 97 to rotate against gravital force about the axis of the shaft 99 which will eventually cause the cutter to finally engage the adjacent surface of the lens blank 22. Thus, the cutter 96 will engage the surface of the lens blank 22 at an angle substantially normal to the tangent of the surface at the point of engagement therewith.

This is diagrammatically illustrated in Fig. 9 wherein the plane of the cutter is indicated by line A and the tangent of the lens surface at the point at which it is engaged by the cutter is shown by line B, with line A being substantially normal to line B.

This condition is maintained at all times during the cutting cycle by means of the pivotal connection between the head 84 and cutter supporting arm 97 and the engagement of the adjusting screw 105 with the plate 55. The adjusting screw 105 is preferably initially adjusted to a position where the cutter will assume an upright position in a plane substantially normal to a horizontal plane through the axis of the shaft 99 when the cutting edge of the cutter is positioned on said latter plane. Thus, as the cutter 96 is moved toward a lens blank, the cutter will progressively assume a lesser angle with respect to said latter plane.

It is important to note that the plane of the cutter 96 is disposed slightly to one side of the center line C of the shaft 99 with the area of engagement of the adjusting screw 105 and with plate 55 being located on the opposite side of the center line of the shaft 99. Thus, as the lever 79 is pressed downwardly during a cutting operation, the cutter 96 will be urged into engagement with the lens blank 22 by the adjusting screw which is maintained in position against the plate 55 to cause the cutter 96 to be maintained at a predetermined angle in accordance with the initial adjustment of the adjusting screw 105.

The adjustment for controlling the resultant size of the lens 22 being cut is accomplished by means of a device carried by the head 84. A cam member 87 is rotatably mounted within the head 84 and is located with its cam surface positioned against a pin 88 carried by the reduced portion 83 of the shaft 73 are held thereagainst by a spring 89 which has one end connected to the pin 88 and its other end connected to the head 84. The cam member 87 is mounted on a shaft 90 which has one end extending into a boss 91 formed on the inner surface of a knurled knob 92 mounted over the end of the head 84 and has its other end connected as by a nut or the like 93 (Fig. 1) to the head 84. The shaft 90 is fixedly connected to the knob 92 by any known means such as screw 94 whereby the cam member 87 will be rotated simultaneously with the knob 92. Thus, it will be seen that when the knob 92 is manually rotated in a clockwise direction, for example, the head 84 will be made to rotate in a clockwise direction about the reduced portion 83 of the shaft 73 due to the action of the cam surface upon the pin 88. Rotation of the knob 92 in the opposite direction will cause the head 84 to rotate in a counter-clockwise direction due to the tension of the spring 89 as it acts to maintain the cam 87 in engagement with the pin 88.

As the head 84 is caused to be rotated about the shaft 73, the cutter supporting arm 97 and cutter 96 will consequently move accordingly. Thus, the resultant size of the lens 22 being cut can be controlled and the adjustment therefor is indicated by graduations 95 provided at the edge of the knob 92 and adjacent portion of the head 84.

From the foregoing it will be seen that all of the objects and advantages of the invention have been accomplished. It will be apparent, however, that many changes may be made in the details of construction and arrangement of parts shown and described without departing from the spirit of the invention as expressed in the accompanying claims. Therefore, it is to be understood that all matter set forth or shown in the accompanying drawings is to be interpreted as illustrative and not in a limiting sense.

I claim:

1. In a cutting machine of the character described, a base, a rotary work table journaled on the base, a pair of shafts journaled on the base for rotative movement about respective axes substantially parallel to the axis of said work table, said shafts each being longitudinally movable in said base, a clamp arm carried by one of said shafts and adapted to overlie and engage a piece of work on said work table, a cutter supporting arm carried by the other of said shafts and adapted to overlie said work, a cutting device carried by said cutter supporting arm and adapted to engage said work, operating means carried by the base acting on the shaft carrying said clamp arm for causing said clamp arm to be moved toward and away from said work and further means cooperating with said operating means to rotate said other shaft for moving said arms simultaneously toward and away from one another into and out of overlying relation with said work.

2. In a cutting machine of the character described, a base, a rotary work table journaled on the base, a cutter mounted on the base to engage work when held on the table, a first shaft journaled on the base for rotative movement about an axis substantially parallel to the axis of said work table, said first shaft being longitudinally movable in said base, a clamp arm carried at one end of said first shaft and adapted to overlie and engage a piece of work on said work table, a second shaft rotatable in said base and having a cam member thereon engaging with cooperating means on said first shaft carrying the clamp arm, said second shaft being rotatable by means of a lever to rotate said cam member and longitudinally move said first shaft carrying the clamp arm to space the clamp arm away from said work, said cam member having a portion adapted to engage the cooperating means on said first shaft carrying the clamp arm when said cam member has been moved a predetermined distance for causing rotation of said first shaft and consequently of said clamp arm, guiding means fixed to the base and a guided portion carried by the first shaft, said guiding means and guided portion being so positioned relative to each other that as the portion of the cam member engages the cooperating means on said first shaft to rotate the same the guided portion will be free to rotate with said first shaft and when said portion of the cam member is moved out of engagement with the cooperating means, the guided portion will engage the guiding means and be restricted thereby to prevent rotation of the first shaft and hold the clamp arm aligned with the table in the longitudinal adjustment of said first shaft, and spring means connected with said first shaft for urging it downwardly against said cam member and retaining said clamp arm in engagement with said work when said lever is in inoperative position.

3. In a cutting machine of the character described, a base, a rotary work table journaled on the base, a pair of shafts journaled on the base for rotative movement about respective axes substantially parallel to the axis of said work table, said shafts each being longitudinally movable in said base, a clamp arm carried at one end of one of said shafts and adapted to overlie and engage a piece of work on said work table, a cutter supporting arm carried by the other of said shafts and adapted to overlie said work, a cutting device carried by said cutter supporting arm and adapted to engage said work, and means cooperatively connected with said clamp arm for causing said clamp arm to be moved toward and away from said work, said means comprising a shaft rotatable in said base and having a cam member thereon engaging the free end of said shaft carrying the clamp arm, said shaft being rotatable to rotate said cam member and longitudinally move said shaft carrying the clamp arm to space the clamp arm away from said work, and protruding means on said cam member adapted to engage cooperating means on said shaft carrying the clamp arm when said cam member has been moved a predetermined distance for causing rotation of said shaft carrying the clamp arm and consequently of said clamp arm, and spring means connected with said shaft for urging said shaft downwardly against said cam member and retaining said clamp arm in engagement with said work when said lever means is in inoperative position, and means for guiding said clamp arm toward the center of said work table comprising an apertured plate member carried by said shaft carrying the clamp arm and a pin member carried by said base and adapted to enter the aperture in said plate member when said clamp arm is properly aligned with said work table.

4. In a cutting machine of the character described, a base, a rotary work table journaled on the base, a pair of shafts journaled on the base for rotative movement about respective axes substantially parallel to the axis of said work table, said shafts each being longitudinally movable in said base, a clamp arm carried by one of said shafts and adapted to overlie and engage a piece of work on said work table, a cutter supporting arm carried by the other of said shafts and adapted to overlie said work, a cutting device carried by said cutter supporting arm and adapted to engage said work, and means cooperatively connected with said cutter supporting arm for causing said arm to move in a plane parallel to the plane of said work table and into and out of overlying relation with said work, said means comprising an operating shaft rotatable in said base and carrying a projecting member thereon, a yoke carried by said shaft carrying the cutter supporting arm and rotatable therewith, said projecting means engaging said yoke when said operating shaft is rotated in one direction for rotating said yoke and shaft and moving said cutter supporting arm out of overlying relation with said work, and spring means connected with said yoke for urging said yoke toward said projecting member and normally retaining said cutter supporting arm in overlying relation with said work.

5. In a cutting machine of the character described, a base, a rotary work table journaled on the base, a clamp shaft and a cutter shaft journaled on the base for rotative movement about respective axes substantially parallel to the axis of said work table, said shafts each being longitudinally movable in said base, a clamp arm carried by one end of said clamp shaft and adapted to overlie and engage a piece of work on said work table, a cutter supporting arm carried by said cutter shaft and adapted to overlie said work, a cutting device carried by said cutter suporting arm and adapted to engage said work, and means cooperatively connected with said clamp arm and cutter supporting arm for causing said clamp arm to be moved toward and away from said work and for moving said arms simultaneously toward and away from one another into and out of overlying relation with said work, said means comprising an operating shaft rotatably mounted in said base and carrying a cam member and a projecting member thereon, said cam member engaging the free end of said clamp shaft, a yoke carried by said cutter shaft and rotatable therewith, said projecting member being adapted to engage said yoke when said operating shaft has been rotated a predetermined amount in one direction, said cam member being rotatable with said operating shaft to longitudinally move said clamp shaft to space the clamp arm away from said work, and protruding means on said cam member for engaging said clamp shaft simultaneously with the engagement of said projecting member with said yoke whereby upon continued rotation of said operating shaft said clamp shaft and cutter shaft will be simultaneously rotated to move said clamp arm and cutter arm out of overlying relation with said work, and spring means connected with said cutter and clamp shafts for normally urging the clamp and cutter arms into their initial positions.

6. In a cutting machine of the character described, a base, a rotary work table journaled on the base, a cutter shaft and a clamp shaft journaled on the base for rotative movement about respective axes substantially parallel to the axis of said work table, said shafts each being longitudinally movable in said base, a clamp arm carried by one end of said clamp shaft and adapted to overlie and engage a piece of work on said work table, a cutter supporting arm carried by said cutter shaft and adapted to overlie said work, a cutting device carried by said cutter suporting arm and adapted to engage said work, a pattern mounted for rotation with said work table, a pattern follower carried by said cutter arm and held in engagement with said pattern for rotating said cutter arm and moving said cutting device toward and away from the edge of said work in accordance with the contour shape of said pattern, pressure applying means for moving said cutting device into engagement with said work comprising a transverse shaft carried by said base, a lever mounted on said transverse shaft for rotation thereof, a yoke carried by said cutter shaft for rotation therewith, and an arcuate operating member connected with said transverse shaft and operable upon application of pressure to said lever to move said cutter supporting arm toward said work for engagement of said cutting device therewith, and follower means connected with said cutter shaft and adapted upon rotation of said work table, to follow the contour of said arcuate operating member as the cutter shaft is rotated by said pattern and the cutting device is raised and lowered in accordance with the surface curvature of said work.

7. In a cutting machine of the character described, a base, a rotary work table journaled on the base, a cutter shaft and a clamp shaft journaled on the base for movement in directions substantially parallel to the axis of said work table, a clamp arm carried by one end of said clamp shaft and adapted to overlie and engage a piece of work on said work table, a rock shaft carried by said cutter shaft and extending in a plane substantially normal to the axis of said cutter shaft, a cutter supporting arm carried by said rock shaft for rotation about the axis thereof, a cutting device carried by said cutter supporting arm and adapted to engage a piece of work on said work table, means for rocking the cutter supporting arm about the axis of said rock shaft when the cutter is being moved into engagement with said work and for moving the cutting device to a position in a plane normal to the tangent of the surface at the point of engagement therewith and for continually retaining it in such a plane throughout the cutting cycle, said means comprising an abutment member carried by said clamp shaft and a contact member carried by said cutter supporting arm and adapted to engage said abutment member, said abutment member being adjustable in a direction normal to the plane of said work table and said contact member being adjustable on said cutter supporting arm toward and away from said rock shaft whereby the angle of said cutting device with respect to said work may be varied.

8. In a cutting machine of the character described, a base, a rotary work table journaled on the base, a clamp shaft and a cutter shaft journaled on the base for rotative movement about respective axes substantially parallel to the axis of said work table, said shafts each being longitudinally movable in said base, a clamp arm connected for movement with said clamp shaft and adapted to overlie and engage a piece of work on said work table, a head carried by said cutter shaft for movement therewith, a cutter supporting arm connected to said head for movement therewith and adapted to overlie said work, a cutting device carried by said cutter supporting arm and adapted to engage said work, and size control means for adjusting said cutting device toward and away from the axis of said work table, said size control means comprising means carried by said head for rotating said head and cutter supporting arm independently of said cutter shaft a controlled amount about the axis of the cutter shaft, said means embodying a cam member rotatably mounted in said head for movement about an axis normal to the axis of the cutter shaft, a pin member extending laterally from said cutter shaft and engaged by said cam member, spring means for retaining said cam member against said pin member, and graduated control means connected with said cam member whereby said cam member may be rotated a controlled amount to move said head about the axis of said cutter shaft and position the cutting device in predetermined position with respect to the axis of said work table.

9. In a cutting machine of the character described embodying a base having means for supporting an article to be cut, a supporting arm connected to said base, clamp means mounted on the base and adjustable into and out of engagement with an article when supported by said supporting means, a cutter member pivotally connected to said supporting arm for movement into and out of engagement with a surface of the article to be cut, abutment means carried by said clamp means adjacent said supporting arm, adjustable engagement means carried by the pivotally supported cutter member for engaging said abutment means for controlling the tilt of the cutter about its pivot, and means for moving the cutter into engagement with the surface of the article.

10. In a cutting machine of the character described embodying a base having means for supporting an article to be cut, clamp means mounted on the base and adjustable into and out of engagement with an article when supported by said supporting means, a pivot member carried upon said base, a supporting arm carried by said pivot member and having a cutter member attached thereto, means for moving said cutter member into engagement with a surface of an article to be cut, said supporting arm being movable about the axis of said pivot member in response to movement of the cutter member into and out of engagement with said surface of the article to be cut, abutment means carried by said clamp means adjacent said supporting arm, engagement means carried by the pivotal supporting arm for engaging said abutment means for controlling the tilt of the cutter, said abutment means and said cutter member being disposed on opposed sides of the axis of said pivot member, whereby the force in response to the means for moving the cutter into engagement with the surface of the article will be directed along a line extending through the axis of the pivot member intermediate said engagement means and said cutter.

11. In a cutting machine of the character described, a base, a rotary work table journaled on the base, a clamp arm adapted to overlie and engage a piece of work on said work table, a shaft journaled on the base for rotative movement about an axis substantially parallel to the axis of said work table, a cutter supporting arm carried by said shaft and adapted to overlie said work, a cutting device carried by said cutter supporting arm and adapted to engage said work, and means cooperatively connected with said cutter supporting arm for causing said arm to move in a plane parallel to the plane of said work table and into and out of overlying relation with said work, said means comprising an operating shaft rotatable in said base and carrying projecting means thereon, a member carried by said shaft carrying the cutter supporting arm and rotatable therewith, said projecting means engaging said member when said operating shaft is rotated in one direction for rotating said member and shaft and moving said cutter supporting arm out of overlying relation with said work, and spring means connected with said member for urging it toward said projecting member and normally retaining said cutter supporting arm in overlying relation with said work.

12. A cutting machine of the character described embodying a base having means for supporting work to be cut, a work clamp mounted on said base to overlie the work and being adjustable toward and away from the work to releasably hold said work on the work supporting means, a support adjustably carried by said base, a cutter and a cutter arm carrying said cutter, the cutter arm being pivotally connected to said adjustable support for movement about an axis disposed to one side of the cutter and extending transversely of the work, means for adjusting said support to bring said pivotal axis toward and away from the work, and adjustable means carried by said cutter arm and work clamp on the opposed side of said axis cooperating together to provide a fulcrum point on said side as the pivotal axis of the cutter arm is moved toward the work to urge the cutter into engagement with the work while maintaining it at a predetermined angle in accordance with the adjustment of said means.

13. A cutting machine of the character described embodying a base, a rotary work supporting table mounted on said base, clamp means mounted on the base to overlie the table and being adjustable toward and away from the table to releasably hold work in place on said table, a support carried by the base, an arm pivotally mounted on said support for movement about an axis extending transversely of the table and said arm having a free end extending over said table, a cutter carried by said free end of the arm and disposed in a plane offset to one side of said pivotal axis, a projection extending laterally from adjacent the pivotally connected end portion of said arm and to the opposed side of said pivotal axis, and cooperating means carried by said projection and clamping means engaging with each other to provide a fulcrum spaced from said pivotal axis and the cutting edge of the cutter such that the cutter will engage the surface of the work at an angle substantially normal to a tangent of the surface of the work at the point of engagement therewith, and means for moving the cutter into engagement with the surface to cut the work on rotation of the table supporting said work.

14. A cutting machine of the character described embodying a base, a rotary work supporting table mounted on said base, clamp means mounted on the base to overlie the table and being adjustable toward and away from the table to releasably hold work in place on said table, a support carried by the base, an arm pivotally mounted on said support for movement about an axis extending transversely of the table and said arm having a free end extending over said table, a cutter carried by said free end of the arm and disposed in a plane offset to one side of the pivoted axis, a projection extending laterally from adjacent the pivotally connected end portion of said arm and to the opposed side of said pivotal axis, an abutment member carried by the clamping means and a pin carried by said projection which is adapted to rest on said abutment to provide a fulcrum spaced from said pivotal axis and the cutting edge of the cutter such that the cutter will engage the surface of the work at an angle substantially normal to a tangent of the surface of the work at the point of engagement therewith, and means for moving the cutter into engagement with the surface to cut the work on rotation of the table supporting said work.

15. A cutting machine of the character described embodying a base, a rotary work supporting table mounted on said base, clamp means mounted on the base to overlie the table and being adjustable toward and away from the table to releasably hold work in place on said table, a support carried by the base, an arm pivotally mounted on said support for movement about an axis extending traversely of the table and said arm having a free end extending over said table, a cutter carried by said free end of the arm and disposed in a plane offset to one side of the pivoted axis, a projection extending laterally from adjacent the pivotally connected end portion of said arm and to the opposed side of said pivotal axis, an abutment plate carried by the clamping means and an adjustable engagement member carried by said projection and adapted to rest on said abutment plate to provide a fulcrum spaced from said pivotal axis and the cutting edge of the cutter such that the cutter will engage the surface of the work at an angle substantially normal to a tangent of the surface of the work at the point of engagement therewith, and means for moving the cutter into engagement with the surface to cut the work on rotation of the table supporting said work.

16. In a cutting machine of the character described embodying a base having means for supporting an article to be cut, a pivot member carried upon said base, a supporting arm carried by said pivot member and having a cutter member attached thereto, means for moving said cutter member into engagement with a surface of an article to be cut, said supporting arm being movable about the axis of said pivot member in response to movement of the cutter member into and out of engagement with said surface of the article, abutment means carried by a member mounted on said base adjacent said supporting arm, said last-named member being movable into engagement with the top surface of the article to position said abutment means in accordance with the thickness of the article, and engagement means carried by the supporting arm for engaging said abutment means for controlling the tilt of the cutter about the axis of said pivot member, said engagement means and said cutter member being disposed on opposed sides of the axis of said pivot member whereby the force in response to the means for moving the cutter into engagement with the surface of the article will be directed along a line extending through the axis of the pivot member intermediate said engagement means and said cutter.

References Cited in the file of this patent

UNITED STATES PATENTS

| | | |
|---|---|---|
| 1,248,145 | Maynard | Nov. 27, 1917 |
| 1,581,883 | Steinle | Apr. 20, 1926 |
| 1,621,331 | Maynard | Mar. 15, 1927 |
| 1,997,561 | Lockhart | Apr. 9, 1935 |
| 2,522,818 | Geula | Sept. 19, 1950 |